US008555061B2

(12) United States Patent
Cooperstein et al.

(10) Patent No.: US 8,555,061 B2
(45) Date of Patent: Oct. 8, 2013

(54) TRANSPARENT CODE

(75) Inventors: Jeffrey M. Cooperstein, Bellevue, WA (US); Charles W. Kaufman, Sammamish, WA (US); Raja Krishnaswamy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1646 days.

(21) Appl. No.: 11/129,718

(22) Filed: May 13, 2005

(65) Prior Publication Data

US 2006/0259763 A1   Nov. 16, 2006

(51) Int. Cl.
*G06F 21/00*   (2013.01)

(52) U.S. Cl.
USPC ........... 713/166; 713/151; 713/152; 713/188; 725/86; 726/6; 726/26

(58) Field of Classification Search
USPC ............ 713/151, 188, 152; 725/86; 726/6, 26
See application file for complete search history.

(56) References Cited

U.S. PATENT DOCUMENTS

| | | | |
|---|---|---|---|
| 6,775,779 B1 * | 8/2004 | England et al. | 726/26 |
| 6,851,112 B1 * | 2/2005 | Chapman | 718/1 |
| 7,076,557 B1 * | 7/2006 | LaMacchia et al. | 709/229 |
| 7,469,408 B2 * | 12/2008 | Carter et al. | 719/310 |
| 2002/0099952 A1 * | 7/2002 | Lambert et al. | 713/200 |
| 2002/0174224 A1 * | 11/2002 | Scheifler et al. | 709/225 |
| 2005/0055565 A1 * | 3/2005 | Fournet et al. | 713/200 |
| 2005/0273861 A1 * | 12/2005 | Chess et al. | 726/25 |
| 2006/0248285 A1 * | 11/2006 | Petev | 711/141 |
| 2006/0248585 A1 * | 11/2006 | Ward et al. | 726/20 |
| 2006/0253837 A1 * | 11/2006 | Hudson et al. | 717/124 |

OTHER PUBLICATIONS

Maaser, "A Concept for Monitoring Self-Transforming Code using Memory Page Access Control Management", 2011, IEEE, pp. 1-7.*

* cited by examiner

*Primary Examiner* — Taghi Arani
*Assistant Examiner* — Gregory Lane
(74) *Attorney, Agent, or Firm* — L. Alan Collins; Collins & Collins Intellectual, LLC

(57) ABSTRACT

Assertions for elevated privilege associated with transparent code may be ignored, prohibited, or modified.

15 Claims, 3 Drawing Sheets

TRANSPARENT CODE

BRIEF DESCRIPTION OF THE DRAWINGS

The present description refers to FIGS. 1-3, described below.

DETAILED DESCRIPTION

The following description is directed to implementations for transparent code-security enforcement in a secure execution environment. More particularly, the description and claims, as well as the accompanying figures, pertain to transparent code, which may be regarded as code for which elevation of privilege operations may not be honored.

The aforementioned secure execution environment may include a managed execution environment, which may be alternatively referred to as a runtime environment. A managed execution environment may provide routines for at least portions of application programs to be executed properly in an operating system because application programs require another software system in order to execute. Thus, at least a portion of an application program may call one or more managed execution environment routines, which reside between the application program and the operating system, and the managed execution environment routines may call the appropriate operating system routines.

Examples of managed execution environments include, but are not limited to: Visual Basic runtime environment; Java® Virtual Machine (JVM) runtime environment that is used to run, e.g., Java® routines; and Common Language Runtime (CLR) to compile, e.g., Microsoft.NET™ applications into machine language before executing a calling routine.

Figure 1:
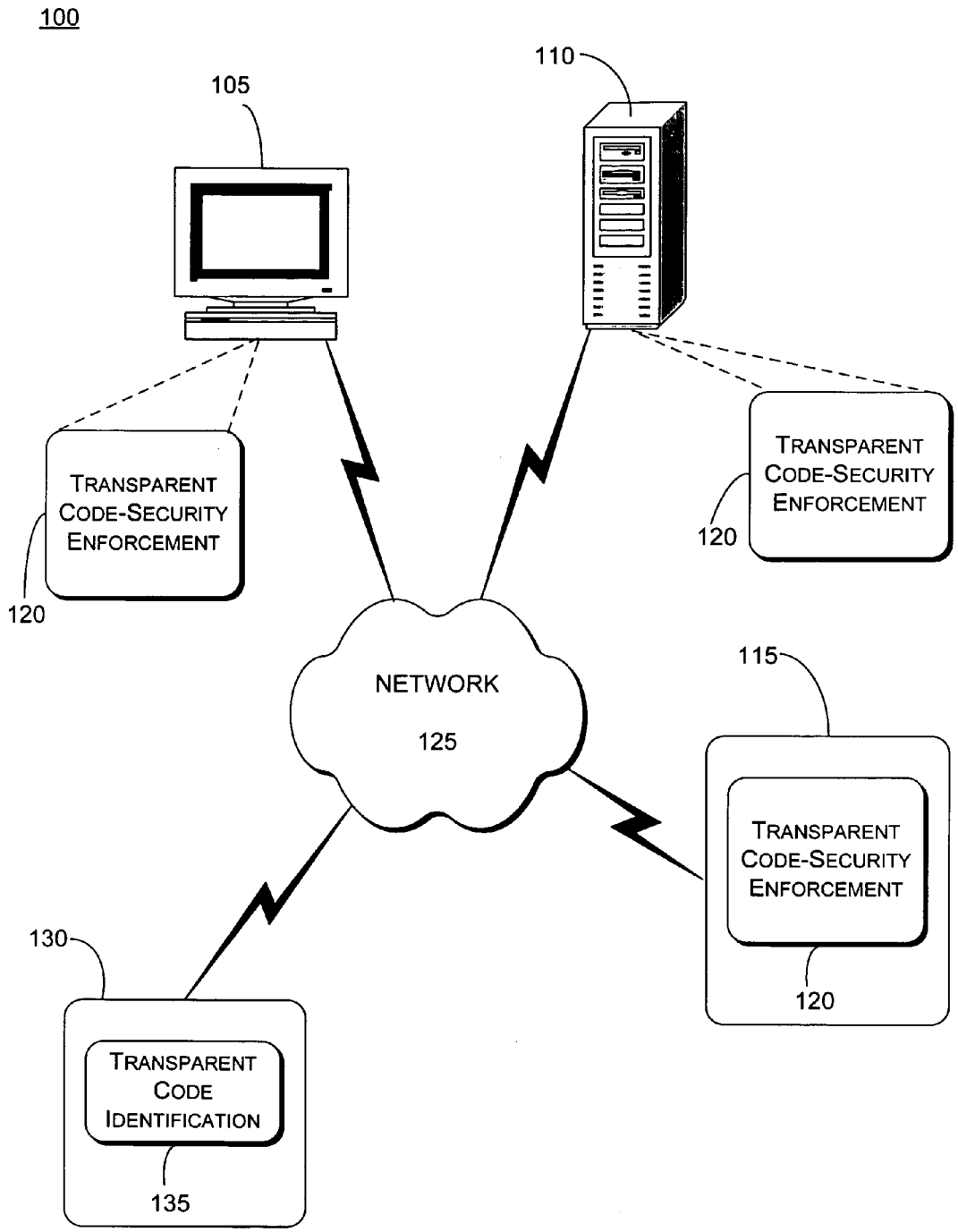
FIG. 1 shows a network environment in which examples of transparent code-security enforcement may be implemented.

FIG. 1 shows example network environment 100 in which implementations of transparent code-security may be enforced. More particularly, any one of client device 105, server device 110, and "other" device 115 may be capable of implementing transparent code-security enforcement 120, as described herein, in a managed execution environment. Client device 105, server device 110, "other" device 115, and data source 130 may be communicatively coupled to one another through network 125.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115. The data may be publicly available or alternatively restricted, e.g., restricted to only certain users or only if an appropriate subscription or licensing fee is paid. Server device 110 may be at least one of a network server, an application server, a web blade server, or any combination thereof.

Typically, server device 110 may be any device that is the source of content, and client device 105 may be any device that receives such content either via network 125 or in an off-line manner. However, according to the example embodiments described herein, server device 105 and client device 110 may -interchangeably be a sending host or a receiving host. "Other" device 115 may also be embodied by any of the above examples of server device 110.

"Other" device 115 may further be any device that is capable of implementing transparent code-security enforcement 120, according to any of the examples described herein, as part of at least one of an application, program, function, or other assemblage of programmable and executable code, in either of a managed execution environment or a testing environment. Thus, "other" device 115 may be a computing or processing device having an interpreter, converter, compiler, operating system, or managed execution environment implemented thereon. These examples are not intended to be limiting in any way, and therefore should not be construed in such manner.

Network 125 may represent any of a variety of conventional network topologies, which may include any wired and/or wireless network. Network 125 may further utilize any of a variety of conventional network protocols, including public and/or proprietary protocols. For example, network 125 may include the Internet, an intranet, or at least portions of one or more local area networks (LANs).

Data source 130 may represent any one of a variety of conventional computing devices, including a desktop personal computer (PC), that is capable of transparent code identification or generation 135 for an application, program, function, or other assemblage of programmable and executable code; and that is further capable of identifying transparent code for any of the aforementioned application, program, function, or other assemblage of programmable and executable code. Alternatively, data source 130 may also be any one of a workstation, mainframe computer, Internet appliance, set-top box, gaming console, personal digital assistant (PDA), laptop computer, cellular telephone, etc., that is capable of transmitting at least a portion of an application, program, or function to another work station. Further, data source 130 need not necessarily be a source of transparent code associated with an application, program, or function, but rather data source 130 is at least the source of an expression of transparent code identification. Regardless of the embodiment, the transparent code identification, or expression thereof, may be transmitted from data source 130 to any of devices 105, 110, and 115 as part of an on-line notification via network 125 or as part of an off-line notification.

Transparent code, as described herein, includes at least a portion of any of an application, program, function, or other assemblage of programmable and executable code, for which an associated operation may be executed on any one of devices 105, 110, and 115. According to at least one example implementation, transparent code may be submitted for execution in a managed execution environment on any one of devices 105, 110, and 115.

Figure 2:
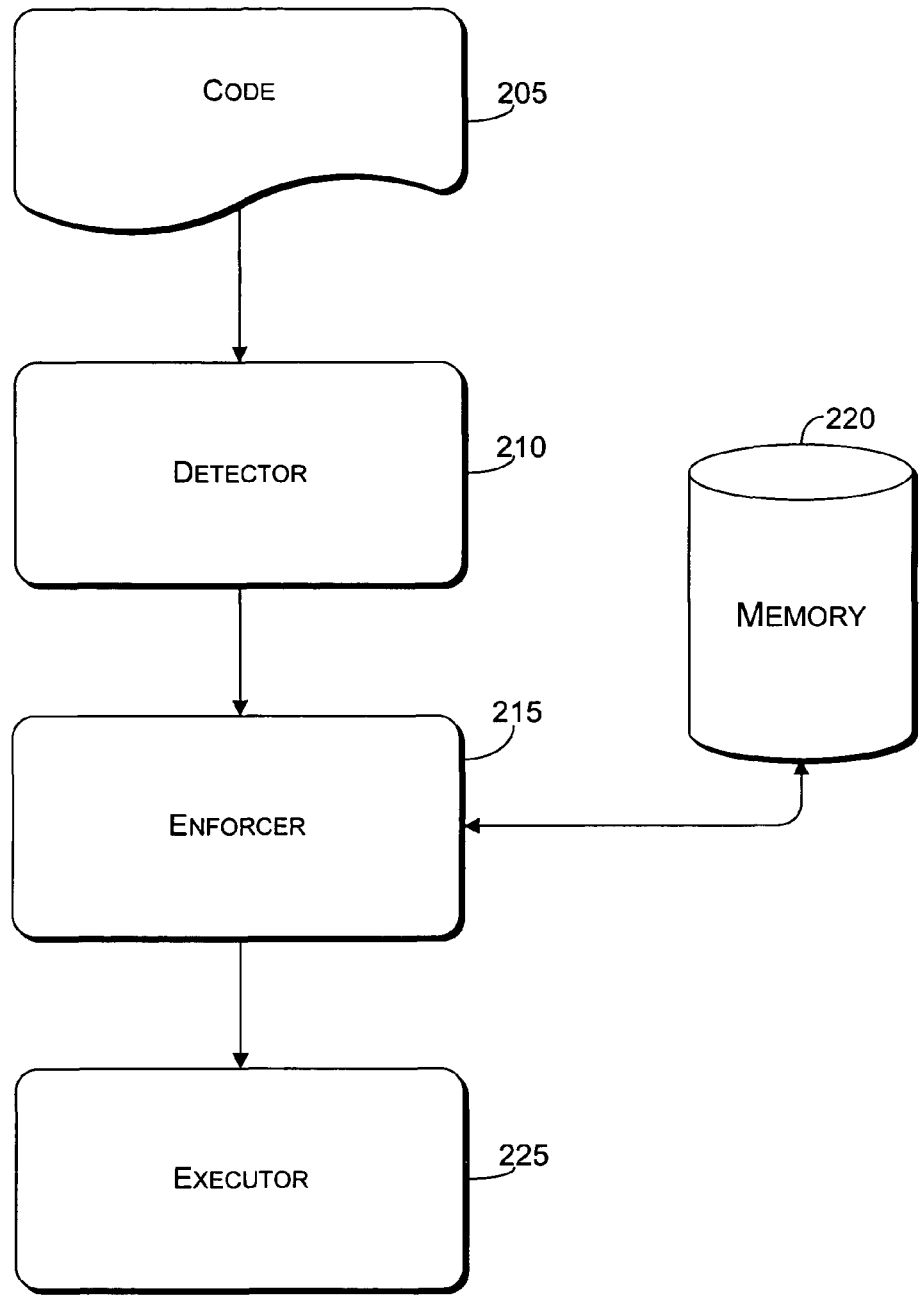
FIG. 2 shows an example system in which transparent code-security enforcement may be implemented.

FIG. 2 shows example system 200 in which transparent code-security enforcement 120 (see FIG. 1) may be implemented. System 200 may be secure execution environment implemented as part of a managed execution (i.e., runtime) environment. However, system 200 is not necessarily limited to a particular execution environment, and therefore such limitations should not be inferred from this description.

In the description of system 200, various operations are described as being performed by modules, 210, 215, and 220. It should be understood that the various operations that are described with respect to a particular one of these modules may be implemented by a module itself, by a combination of two or more of the modules, or by a module in cooperation with the execution environment in which the module is included or associated. Further, the operations described herein may be implemented as processor executable instructions that are embodied in one or more forms of computer-readable media. Further still, these operations may be implemented as hardware, firmware, or some combination of hardware, firmware, and software, either as a part of, or in some other way associated with, the execution environment in which the respective operation is included or associated.

Code 205 may be regarded as transparent code, which comprises at least a portion of an application, program, function, or other assemblage of programmable and executable code. Code 205 may be regarded as "transparent" to denote the security-transparent nature of the code. More specifically, transparent code may be prohibited, or limited to a certain extent, from elevating a privilege for an operation that may be associated with code 205. One of many motivations for such prohibition, or limitation, is because such an elevation of privilege may expose security sensitive resources associated with at least a portion of code 205 to un-trusted callers. Therefore, there are permissions that, if associated with at least a portion of code 205, may prevent code 205 from being considered "transparent."

Elevation of privilege operations may be associated with a security model or policy that may assign permissions to one or more assemblies of code based on evidence within a respective assembly. Such security model or policy may allow various assemblies of code to be executed on different trust levels within a common application domain. For example, in a managed execution environment, an assembly that is installed locally on any of devices 105, 110, and 115 (see FIG. 1) may be granted full-trust status and therefore subject to maximal security auditing. On the other hand, an assembly loaded into the secure execution environment from the internet or otherwise acquired from an unknown or untrusted source may be granted a less-than-full trust status, and therefore may not be subject to a security audit. Thus, in response to a function call, an API (application programming interface) that exposes protected functionality may initiate a security demand to check all callers on the corresponding stack. According to such security models or policies that assign permissions to one or more assemblies, a security demand may be satisfied by a privilege elevation asserted by the code.

Detector 210 may be regarded as a module to receive code 205 and to further detect a permission that has been accorded to code 205. Alternatively, detector 210 may be a module to determine a security policy under which an operation associated with at least a portion of code 205 may be executed. More particularly, if code 205 is determined to be transparent code or one or more operations associated with at least a portion of code 205 is to be executed under a transparent-code security model or policy, detector 210 is to further determine which, if any, privilege elevation operations may be associated with code 205.

Enforcer 215 may be regarded as a module to implement security procedures upon at least a portion of code 205, according to the permissions accorded to at least one portion of code 205 or the security policy under which at least a portion of code 205 is to be executed.

More particularly, if detector 210 determines that at least a portion of code 205 is transparent code, enforcer 215 may prepare at least a portion of code 205 for execution by executor 225. Such portion of code 205 may be prepared for execution under the guidance of the following policies for transparent code-security implementation.

First, enforcer 215 may permit at least a portion of code 205 to be executed by executor 225 in accordance with the elevated privilege expressed, or otherwise associated, with at least a portion of code 205. That is, if at least a portion of code 205 is expressly noted as not being transparent or otherwise exempted from transparent code-security enforcement 120, execution of an operation associated with one or more portions of code 205 in accordance with the asserted elevated privilege may be permitted. Alternatively, if at least a portion of code 205 is transparent, execution of an operation associated with one or more portions of code 205 in accordance with the asserted elevated privilege may also be permitted if, at the time of execution, the operation associated with the one or more portions of code 205 is currently being executed by a caller that is allowed to execute the aforementioned operation in accordance with the asserted privilege. If the caller is also transparent, then, recursively, callers for the caller may be checked to determine whether the aforementioned operation is in accordance with the asserted privilege.

Second, enforcer 215 may ignore the outright assertion of elevated privilege but then permit an operation associated with one or more portions of code 205 to be executed by executor 225 in accordance with the elevated privilege if enforcer 215 is able to transform the operation for which the elevated privilege is asserted into a safe variant that is appropriate for the security model and the secure execution environment.

Third, enforcer 215 may ignore, prohibit, or otherwise limit execution of an operation associated with one or more portions of code 205 for which the elevated privilege is asserted. Such policy may be enforced, for example: when a security model for the secure execution environment (i.e., transparent-code security implementation 120) prohibits transparent code from performing an associated operation entirely; if a transparent portion of code 205 that is to be executed by a caller is prohibited from doing so in accordance with the security model; the operation may not be transformed into a safe variant; or a transformed safe variant throws an exception, thus denying the operation for which the elevated privilege is asserted.

Executor 225 may be regarded as a module to execute code 205, modify code 205, or prohibit execution of an operation associated with one or more portions of code 205 in accordance with the security procedures implemented by enforcer 215.

Even more particularly, enforcer 215 may detect an asserted elevation of privilege for at least one operation associated with at least a portion of code 205 and implement a correspondingly appropriate security procedure for enforcement by executor 225. Non-limiting examples of such assertions for elevating privilege, as detected by detector 210, and examples of such appropriate security procedures, as implemented by enforcer 215, are as follows.

Detector 210 may detect an attempt by code 205 to explicitly assert an elevated privilege for one or more operations associated therewith. Enforcer 215, as part of a security model or policy or on a per-process basis, may prohibit an operation associated with a transparent portion of code 205 from executing. Alternatively, enforcer 215 may ignore an operation associated with a transparent portion of code 205, thereby throwing an exception. Further still, enforcer 215 may enable an operation associated with a transparent portion of code 205 to be expressed, and therefore executed, safely if the calling methods for the transparent portion of code 205 are allowed to perform the privileged operation. If the calling method is transparent, then, recursively, callers for the caller may be checked to determine whether the callers are permitted to perform the privileged operation.

Detector 210 may further detect an attempt by code 205 to assert an elevated privilege for one or more operations associated therewith by requiring one or more link-time security checks to be performed on immediate callers of code 205. Enforcer 215, as part of a security model or policy or on a per-process basis, may insert a runtime check to perform a stackwalk into code that may satisfy the link demand; may prohibit an operation associated with one or more portions of code 205 from calling a method decorated with such a link demand; or, alternatively, may enable the operation to be expressed safely by allowing an operation associated with one or more portions of code 205 to conditionally call a method decorated with such a link demand if the calling methods are allowed to perform the privileged operation.

Detector 210 may also detect an attempt by code 205 to assert an elevated privilege by accessing private or internal managed code within the same assembly by exploiting the fact that only public critical code may be considered to be safe for access from non-privileged code. Enforcer 215, as part of a security model or policy or on a per-process basis, may prohibit an operation associated with one or more portions of code 205 from calling non-public managed code. Further, enforcer 215 may allow a transparent portion of code 205 to access non-public managed code that is marked with a special attribute. Alternatively, enforcer 215 may allow an operation associated with one or more portions of code 205 to conditionally call non-public methods if corresponding callers are privileged to access the non-public methods.

Detector 210 may also detect an attempt by code 205 to assert an elevated privilege if unverifiable code is contained therein. Enforcer 215, as part of a security model or policy or on a per-process basis, may prohibit an operation associated with one or more portions of code 205 that is unverifiable from executing. Alternatively, enforcer 215 may ignore an operation associated with a transparent portion of code 205 that is unverifiable, thereby throwing an exception. Further still, enforcer 215 may enable an operation associated with a transparent portion of code 205 that is unverifiable to be expressed, and therefore executed, safely if the calling methods for the transparent portion of code 205 are allowed to perform the privileged operation.

Detector 210 may further detect an attempt by code 205 to assert an elevated privilege as code 205 is generated and executed in a real time manner (i.e., "on the fly"). Code that is generated and executed in such manner may be treated as arbitrary sets of bytes of code that is freely executed. Enforcer 215, as part of a security model or policy or on a per-process basis, may prohibit an operation associated with a portion of code 205 that is generated on the fly from executing. Alternatively, enforcer 215 may treat all code that is generated on the fly as being transparent, and therefore prohibit all operations associated with a transparent portion of code 205 from executing. Further still, enforcer 215 may enable an operation associated with a transparent portion of code 205 that is generated on the fly to be expressed, and therefore executed, safely if the calling methods for the transparent portion of code 205 are allowed to perform the privileged operation.

As shown by the non-limiting examples described above, operations for which an elevated privilege is asserted may be expressed, and therefore executed, safely if the corresponding calling methods are also allowed to perform the privileged operation. The privileges accorded to the calling methods may be revealed by a stack trace for code 205. A stack trace may refer to a sequence of frames on a call stack, which may refer to a reserved portion of memory 220 that tracks a sequence of methods called in an application or program to which code 205 is associated. More particularly, a stack trace may refer to a reserved amount of memory 220 that tracks a sequence of functions, methods, or other portions of executable code called in an application or program. Each frame of a call stack may refer to at least one of a function, method, routine, instruction pointer, and register value that have been pushed on the call stack.

Further, the exceptions referred to in the description pertaining to FIG. 2 relate to unanticipated or undesired conditions resulting from execution environment routines or subroutines that are injected into at least a portion of code 205. Non-limiting examples of such exceptions include, but are not limited to, resource failures such as a thread-abort condition, a stack overflow condition, or an out-of-memory condition. A thread abort condition is a call to abort a thread in which code 205 is being executed. An out-of-memory condition may result if the execution of an execution environment routine or subroutine within a designated portion of code 205 requires amounts of hardware memory or virtual memory that are not compatible with other processes, and therefore such memory allocations may not be accommodated. A stack overflow condition may result if the execution of the runtime environment routine or subroutine within the designated portion of code 205 requires more hardware memory or virtual memory than is available on a stack. Alternatively, a stack overflow condition may occur as a result of an execution environment routine or subroutine that has an infinite recursion or a level of method calls that extends beyond a predetermined threshold level.

Figure 3:
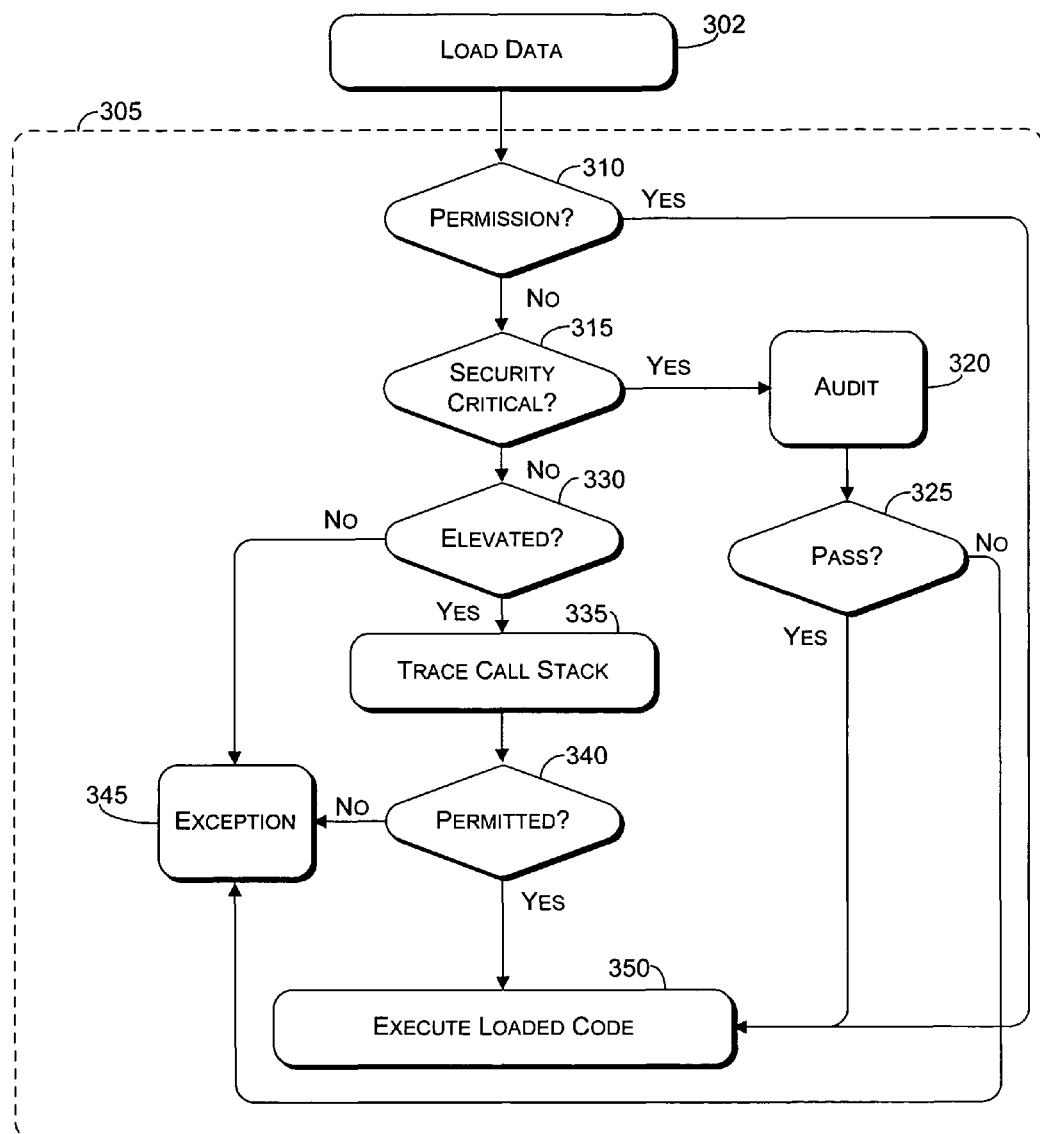
FIG. 3 shows an example processing flow for transparent code-security enforcement implementation.

FIG. 3 shows example processing flow 300 for implementing transparent code-security enforcement 120 (see FIG. 1). Processing flow 300 is described below with references to features from FIGS. 1 and 2, particularly system 200 of FIG. 2. However, such implementations are provided only as examples and are not intended to be construed in any limiting manner. That is, in the description of processing flow 300, various operations may be attributed to modules, 210, 215, and 220 of FIG. 2. However, the various operations that are described with respect to a particular one of these modules may be implemented by the referenced module itself, by a combination of two or more of the modules, or by a module in cooperation with the execution environment in which the module is included or associated. Even further, alternative implementations of processing flow 300 may be ordered differently than the present description. The ordering described herein is provided only as an example, and should not be interpreted as being limiting in any manner.

Block 302 may refer to code 205 being loaded into execution environment 305. Execution environment 305 may be a managed execution environment (i.e., runtime environment) that may provide routines for an operation associated with one or more portions of code 205 to be executed properly in an operating system. As stated above, non-limiting examples of execution environment 305 include, but are not limited to: Visual Basic runtime environment; Java® Virtual Machine (JVM); and Common Language Runtime (CLR).

Decision 310 may refer to detector 210 detecting whether an operation associated with one or more portions of code 205 is permitted to be executed.

Positive decision 310 advances processing flow 300 to block 350 at which the permitted operation associated with code 205 may be executed.

Decision 315, subsequent to negative decision 310, may refer to detector 210 determining if an operation associated with one or more portions of code 205 may be considered "security critical." That is, as part of a security model or policy or on a per-process basis, if detector 210 detects that calls made to at least a portion of code 205 are to be verified as permissible before execution thereof, code 205 may be deemed "security critical."

Positive decision 315 may advance processing flow 300 to block 320 at which at least a portion of code 205 may be subject to a security audit. The security audit may utilize known auditing implementations, and thus a description thereof is not included here.

Decision 325 may refer to auditor determining whether or not the security audit at block 320 was passed by the tested portion of code 205. Positive decision 325 may advance processing flow 300 to block 350 at which the permitted operation associated with code 205 may be executed. Negative decision 325 may advance processing flow 300 to block 345 at which an exception may be thrown within execution environment 305.

Decision 330 may refer to detector 210 determining whether an assertion is made to elevate a permission to execute an operation associated with one or more portions of code 205. Negative decision 330 may advance processing flow 300 to block 345 at which an exception may be thrown within execution environment 305.

Thus, the transparent nature of at least a portion of code 205 may be declared as part of a default security model or policy. Thus, any detection of an attempt to assert an elevated privilege (i.e., decision 330) a stack trace may be implemented for any code loaded into execution environment 305 to determine whether or not one or more associated calling methods have the permission sought by the loaded code.

Alternatively, the transparent nature of at least a portion of code 205 may be revealed, as part of a security model or policy or on a per-process basis, as a result of negative decisions 310 and 315. That is, if an operation associated with at least a portion of code 205 is not permitted (negative decision 310) and a call made to at least the aforementioned portion of code 205 is not required to be verified before being executed (negative decision 315), an inference may be made that at least a portion of code 205 is transparent. In particular, an operation associated with at least a portion of code 205 may be disallowed or prohibited from being executed unless a stack trace reveals that one or more associated calling methods have the permission sought by code 205.

Block 335, subsequent to positive decision 330, may refer to enforcer 215 accessing memory 220 to perform a stack trace for code 205. That is, enforcer 215 may enable an operation associated with a transparent portion of code 205 to either be expressed or executed safely if calling methods for the transparent portion of code 205 are allowed to perform the operation for which elevated permission has been asserted. Thus, a call stack corresponding to at least a portion of code 205 may be traced to determine the permissions corresponding to one or more methods that call at least a transparent portion of code 205.

Decision 340 may refer to enforcer 215 determining whether an operation associated with one or more portions of code 205 may be expressed or executed safely, as a result of the stack trace performed at block 335. Positive decision 340 may advance processing flow 300 to block 350 at which the permitted operation associated with code 205 may be executed. Negative decision 340 may advance processing flow 300 to block 345 at which an exception may be thrown within execution environment 305.

Whether as part of a security model or policy or on a per-process basis, transparent code-security enforcement 120 (see FIG. 1) may be implemented at various stages of execution within execution environment 305.

For example, transparent code-security enforcement 120 may be implemented when code 205 is developed. That is, a development environment editor, language syntax checker, compiler, or other tools for developing at least a portion of code 205 may perform the transparency checks on code 205 at any stage of development.

Thus, at least a portion of code 205 may contain, in various combinations: built-in checks that are triggered when at least a portion of code 205 is to implement transparent code-security enforcement 120; conditional code paths that may be executed based on a context of a caller of at least a portion of code 205 to implement transparent code-security enforcement 120; safe transformations of certain privileged operations to implement transparent code-security enforcement 120; optimizations to ensure non-transparent code may execute efficiently; optimizations to ensure that transparent code executes efficiently when a context of a caller is privileged; optimizations to ensure that at least a portion of code 205 may be shared efficiently across processes/contexts without loss of transparent code-security enforcement 120; and optimizations to ensure that at least a portion of code 205 may be serviced or patched for updates that maintain transparent code-security enforcement 120 without a substantial performance penalty in a patched version.

As another example, transparent code-security enforcement 120 may be implemented after one or more portions of code 205 have been developed, published, or deployed. More particularly, post validation tools that run against a pre-build of at least a portion of code 205 may implement transparent code-security enforcement 120, or a validation tool may be integrated with installers to implement transparent code-security enforcement 120 when at least a portion of code 205 is deployed to end machines (where they will execute).

Thus, at least a portion of code 205 may contain, in various combinations: built-in checks that may be triggered when at least a portion of code 205 is executed to implement transparent code-security enforcement 120; conditional code paths that may be executed based on a context of a caller of at least a portion of code 205 to implement transparent code-security enforcement 120; safe transformations of certain privileged operations to implement transparent code-security enforcement 120; optimizations to ensure non-transparent code may execute efficiently; optimizations to ensure that transparent code executes efficiently when a context of a caller is privileged; optimizations to ensure that at least a portion of code 205 may be shared efficiently across processes/contexts without loss of transparent code-security enforcement 120; and optimizations to ensure that at least a portion of code 205 may be serviced or patched for updates that maintain transparent code-security enforcement 120 without a substantial performance penalty in a patched version.

As yet another example, transparent code-security enforcement 120 may be implemented, statically or dynamically, while an operation associated with at least a portion of code 205 is being executed. More particularly: execution environment 305 may implement transparent code-security enforcement 120 before any operation associated with code 205 is executed; execution environment 305 may convert at least a portion of code 205 into an optimized format just before the code is executed, and transparent code-security enforcement 120 may be implemented during this stage.

Thus, at least a portion of code 205 may contain, in various combinations: built-in checks that may be triggered when at least a portion of code 205 is executed to implement transparent code-security enforcement 120; conditional code paths that may be executed based on a context of a caller of at least a portion of code 205 to implement transparent code-security enforcement 120; safe transformations of certain privileged operations to implement transparent code-security enforcement 120; optimizations to ensure non-transparent code may execute efficiently; optimizations to ensure that transparent code executes efficiently when a context of a caller is privileged; optimizations to ensure that at least a portion of code 205 may be shared efficiently across processes/contexts without loss of transparent code-security enforcement 120; and optimizations to ensure that at least a portion of code 205 may be serviced or patched for updates that maintain transparent code-security enforcement 120 without a substantial performance penalty in a patched version.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of the system of FIG. 2 and the processing flow of FIG. 3 may be stored, transmitted, or otherwise implemented utilizing some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "an implementation," "implementations," or "an example implementation" meaning that a particular described feature, structure, or characteristic is included in at least one example of the present invention. Thus, usage of such phrases may refer to more than just one example or example implementation. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementation and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method performed on a computing device, the method comprising:
    detecting, by a computer, that an operation associated with a portion of code is not permitted to be executed;
    executing a security audit on the portion of the code;
    determining, by the computer, that the portion of the code is not security critical, wherein security critical indicates that code be verified as permissible before execution;
    detecting, by the computer, an assertion to elevate a permission required to execute the operation;
    inferring, by the computer based on the determining and the detected assertion, that the portion of the code is transparent, wherein the transparent portion of the code is limited from elevating a privilege for the operation of the transparent portion of the code;
    tracing, by the computer in response to the inferring, a call stack that tracks calls made by at least one method; and
    executing the operation, by the computer in response to the tracing revealing that a required permission is associated with the at least one method and in response to at least one of the calls made by the at least one method and to the portion of the code, wherein the required permission indicates that the at least one method is allowed to perform the operation.

2. The method according to claim 1, wherein the tracing includes finding a previous attempt to elevate the required permission.

3. The method according to claim 1, further comprising:
    executing a security audit on the portion of the code; and
    prohibiting the portion of the code from calling another of portion of the code.

4. At least one computer-readable storage device storing computer-readable instructions that, when executed by a computing device, cause the computing device to perform actions comprising:
    detecting an assertion of elevated privilege associated with at least one portion of transparent code, wherein the transparent code includes an operation that is not permitted to be executed, and wherein the transparent code is limited from elevating a privilege for the operation of the transparent code;
    performing a security audit on the at least one portion of transparent code;
    determining, based on a stack trace, that one or more calling methods that made one or more calls to the transparent code have permission to execute the operation;
    enforcing, based on the assertion of elevated privilege and the permission, a security policy on the transparent code; and
    executing the operation of the transparent code upon verification of the elevated privilege and based on the enforcing.

5. The at least one computer-readable storage device according to claim 4, wherein the security policy causes the computing device to ignore the assertion of elevated privilege.

6. The at least one computer-readable storage device according to claim 4, wherein the security policy causes the computing device to change an execution characteristic of the at least one portion of the transparent code.

7. The at least one computer-readable storage device according to claim 4, wherein the security policy causes the computing device to leave the at least one portion of the transparent code unchanged.

8. The at least one computer-readable storage device according to claim 4, wherein the security policy causes the computing device to deter the assertion of elevated privilege in response to a method calling the at least one portion of the transparent code that does not include a privilege for which the assertion of elevated privilege is made.

9. A system comprising:
a computing device including a memory;
a detector implemented by the computing device and configured for detecting that an operation of one or more portions of code is not permitted to be executed, and for detecting an assertion of elevated privilege associated with the one or more portions of the code, and for determining that calls made to the one or more portions of the code are to be verified as permissible before execution of the operation, where the one or more portions of the code is limited from elevating a privilege for the operation of the one or more portions of the code, and where a security audit is performed on at least one of the one or more portions of the code;
an enforcer implemented by the computing device and configured for tracing, in response to the determining, a call stack that tracks calls made by at least one method to the one or more portions of the code; and
and executor implemented by the computing device and configured for executing, in response to the tracing revealing that a required permission is associated with the at least one method that made at least one of the calls made to the one or more portions of the code and in response to at least one of the calls made to the one or more portions of the code, the operation associated with the one or more portions of the code, where the required permission indicates that the at least one method is allowed to perform the operation.

10. A system according to claim 9, wherein the tracing includes finding a previous attempt to elevate the required permission.

11. A method according to claim 9, the enforcer further configured for prohibiting the one of the one or more portions of the code from calling another of the one or more portions of the code.

12. A system according to claim 9, the enforcer further configured to ignore, based on a security policy, the assertion of elevated privilege.

13. A system according to claim 9, the enforcer further configured to change, based on a security policy, an execution characteristic of the one or more portions of the code.

14. A system according to claim 9, the enforcer further configured to deter, based on a security policy, the assertion of elevated privilege in response to a method calling one of the one or more portions of the code that does not include a privilege for which the assertion of elevated privilege is made.

15. A method according to claim 1, wherein the transparent portion of the code is configured for execution in a managed execution environment.

* * * * *